(12) United States Patent
Heidenreich et al.

(10) Patent No.: US 9,397,509 B2
(45) Date of Patent: Jul. 19, 2016

(54) CHARGE EQUALIZATION SYSTEMS AND METHODS FOR BATTERY SYSTEMS AND UNINTERRUPTIBLE POWER SUPPLIES

(75) Inventors: James Joseph Heidenreich, Bellingham, WA (US); Michael A. Haass, Bellingham, WA (US); Thanh Quoc Le, Ferndale, WA (US); Seth William Jennings, Ferndale, WA (US)

(73) Assignee: Alpha Technologies Inc., Bellingham, WA (US)

( * ) Notice: Subject to any disclaimer, the term of this patent is extended or adjusted under 35 U.S.C. 154(b) by 793 days.

(21) Appl. No.: 13/350,706

(22) Filed: Jan. 13, 2012

(65) Prior Publication Data
US 2012/0217806 A1    Aug. 30, 2012

Related U.S. Application Data

(60) Provisional application No. 61/435,298, filed on Jan. 22, 2011.

(51) Int. Cl.
*H02J 7/00* (2006.01)
*H02J 9/06* (2006.01)

(52) U.S. Cl.
CPC .............. *H02J 7/0019* (2013.01); *H02J 9/061* (2013.01); *Y10T 307/527* (2015.04)

(58) Field of Classification Search
CPC ...................................................... H02J 7/0016
USPC .......................................................... 320/119
See application file for complete search history.

(56) References Cited

U.S. PATENT DOCUMENTS

| 4,079,303 | A | 3/1978 | Cox |
| 4,184,197 | A | 1/1980 | Cuk et al. |
| 4,186,437 | A | 1/1980 | Cuk |
| 4,479,083 | A | 10/1984 | Sullivan |
| 4,502,000 | A | 2/1985 | Mashikian |
| 4,502,001 | A | 2/1985 | Galloway |
| 4,684,814 | A | 8/1987 | Radomski |

(Continued)

FOREIGN PATENT DOCUMENTS

| AU | 2029495 | 12/1995 |
| CA | 1265231 | 1/1990 |

(Continued)

OTHER PUBLICATIONS

PCT International Search Report, PCT/US2012021383, Nov. 29, 2012, 12 pages.

*Primary Examiner* — Yalkew Fantu
(74) *Attorney, Agent, or Firm* — Michael R. Schacht; Schacht Law Office, Inc.

(57) ABSTRACT

A battery system having at least one battery string of more than two batteries connected in series, a charge equalization circuit, a relay matrix, and a balance controller. The charge equalization circuit is capable of equalizing the charge on any pair of series connected batteries in the at least one battery string. The relay matrix is operatively connected between the charge equalization circuit and the at least one battery string. The balance controller controls the relay matrix such that at least one to battery characteristic of at least one battery is sensed. Based on at least one sensed battery characteristic, the balance controller controls the relay matrix such that the charge equalization circuit is connected across at least one pair of series connected batteries in the at least one battery string.

16 Claims, 12 Drawing Sheets

(56) References Cited

U.S. PATENT DOCUMENTS

| | | |
|---|---|---|
| 4,943,763 A | 7/1990 | Bobry |
| 4,949,028 A | 8/1990 | Brune |
| 4,967,136 A | 10/1990 | Nofzinger |
| 4,975,649 A | 12/1990 | Bobry |
| 5,003,244 A | 3/1991 | Davis, Jr. |
| 5,010,469 A | 4/1991 | Bobry |
| 5,029,285 A | 7/1991 | Bobry |
| 5,302,858 A | 4/1994 | Folts |
| 5,400,005 A | 3/1995 | Bobry |
| 5,410,720 A | 4/1995 | Osterman |
| 5,457,377 A | 10/1995 | Jonsson |
| 5,479,083 A | 12/1995 | Brainard |
| 5,504,415 A * | 4/1996 | Podrazhansky et al. ...... 320/118 |
| 5,528,122 A * | 6/1996 | Sullivan et al. ............ 320/118 |
| 5,532,525 A | 7/1996 | Kaiser et al. |
| 5,594,320 A | 1/1997 | Pacholok et al. |
| 5,638,244 A | 6/1997 | Mekanik et al. |
| 5,642,002 A | 6/1997 | Mekanik et al. |
| 5,666,041 A | 9/1997 | Stuart et al. |
| 5,710,504 A | 1/1998 | Pascual et al. |
| 5,739,595 A | 4/1998 | Mekanik et al. |
| 5,760,495 A | 6/1998 | Mekanik |
| 5,892,431 A | 4/1999 | Osterman |
| 5,956,241 A | 9/1999 | LoCascio |
| 5,961,604 A | 10/1999 | Anderson et al. |
| 5,982,142 A | 11/1999 | Sullivan et al. |
| 5,982,143 A | 11/1999 | Stuart |
| 5,994,793 A | 11/1999 | Bobry |
| 6,008,623 A | 12/1999 | Chen et al. |
| 6,014,015 A | 1/2000 | Thorne et al. |
| 6,140,800 A | 10/2000 | Peterson |
| 6,222,344 B1 | 4/2001 | Peterson et al. |
| 6,288,916 B1 | 9/2001 | Liu et al. |
| 6,348,782 B1 | 2/2002 | Oughton, Jr. et al. |
| 6,486,399 B1 | 11/2002 | Armstrong et al. |
| 6,518,725 B2 | 2/2003 | Marten |
| 6,602,627 B2 | 8/2003 | Liu et al. |
| 6,841,971 B1 | 1/2005 | Spee et al. |
| 6,867,567 B2 * | 3/2005 | Yokota et al. ................. 320/134 |
| 6,933,626 B2 | 8/2005 | Oughton, Jr. |
| 7,040,920 B2 | 5/2006 | Johnson, Jr. et al. |
| 7,182,632 B1 | 2/2007 | Johnson, Jr. et al. |
| 7,400,113 B2 * | 7/2008 | Osborne ............... H02J 7/0018 320/118 |
| 2004/0135544 A1 * | 7/2004 | King et al. ..................... 320/116 |
| 2004/0135546 A1 * | 7/2004 | Chertok et al. ............... 320/118 |
| 2012/0091811 A1 | 4/2012 | Heidenreich et al. |
| 2012/0212051 A1 | 8/2012 | Heidenreich et al. |
| 2012/0217800 A1 | 8/2012 | Heidenreich et al. |
| 2012/0217806 A1 | 8/2012 | Heidenreich et al. |
| 2012/0217808 A1 | 8/2012 | Richardson et al. |

FOREIGN PATENT DOCUMENTS

| | | |
|---|---|---|
| CA | 2033685 | 10/1991 |
| CA | 2036296 | 11/1991 |
| CA | 1297546 | 3/1992 |
| CA | 2086897 | 7/1993 |
| CA | 2028269 | 1/2000 |
| CA | 2149845 | 2/2000 |
| CA | 2403888 | 9/2002 |
| CA | 2168520 | 8/2003 |
| CA | 2504101 | 6/2005 |
| CA | 2713017 | 7/2009 |
| CA | 2760581 | 11/2010 |
| EP | 2425515 | 3/2012 |
| GB | 2355350 | 4/2001 |
| JP | 2001190035 | 7/2001 |
| JP | 2008017632 | 1/2008 |
| JP | 2009011022 | 1/2009 |
| JP | 2010063198 | 3/2010 |
| JP | 2010104230 | 5/2010 |
| TW | VI414756 U1 | 10/2011 |
| WO | 2009094540 | 7/2009 |
| WO | 2012099911 | 7/2012 |
| WO | 2012112252 | 8/2012 |

* cited by examiner

CHARGE EQUALIZATION SYSTEMS AND METHODS FOR BATTERY SYSTEMS AND UNINTERRUPTIBLE POWER SUPPLIES

RELATED APPLICATIONS

This application, U.S. patent application Ser. No. 13/350,706, claims benefit of U.S. Provisional Patent Application Ser. No. 61/435,298 filed Jan. 22, 2011.

TECHNICAL FIELD

The present invention relates to the charging of batteries in strings of series connected batteries and, more specifically, to the charging of batteries used in uninterruptible power supply systems.

BACKGROUND

Uninterruptible power supplies (UPS's) have long been used to provide at least temporary auxiliary power to electronic devices. Typically, a UPS is configured to switch between a primary power source and a standby power source as necessary to maintain constant power to a load.

For example, the primary power source may be a utility power supply, and the standby power source may take the form of a battery system. The UPS will normally operate in a line mode in which the utility power signal is passed to the load when the utility power signal is within predefined parameters. In the line mode, the UPS will typically also charge the battery system. When the utility power falls outside of the predefined parameters, the UPS will switch to standby mode in which an AC signal is generated based on the energy stored in the battery system.

A battery system for use in a UPS is typically specified by the nature of the UPS system, a load voltage level required for proper operation of the load, and a length of time the UPS operates in standby mode. Commonly, a number of batteries are connected in series in a string to provide a desired battery voltage level necessary for generation of the load voltage level, and a number of strings are connected in parallel to increase the storage capacity of the battery system. Accordingly, it is not uncommon for a UPS system to be provided with two to four strings comprising three or four batteries each.

In line mode, the UPS system includes a charging system for generating a charge signal that is applied to the battery system to maintain a full charge on the batteries so that the battery system operates to specification when in standby mode.

An object of the present invention is to provide improved battery charge systems for strings of series connected batteries and methods in general and improved battery charge systems specifically designed for use on any battery charger as generally described above.

SUMMARY

The present invention may be embodied as a battery system comprising at least one battery string comprising more than two batteries connected in series, a charge equalization circuit, a relay matrix, and a balance controller. The charge equalization circuit is capable of equalizing the charge on any pair of series connected batteries in the at least one battery string. The relay matrix is operatively connected between the charge equalization circuit and the at least one battery string. The balance controller controls the relay matrix such that at least one battery characteristic of at least one battery is sensed. Based on at least one sensed battery characteristic, the balance controller controls the relay matrix such that the charge equalization circuit is connected across at least one pair of series connected batteries in the at least one battery string.

The present invention may also be embodied as a UPS system for supplying power to a load based on a power signal provided by a power source, comprising at least one battery string comprising more than two batteries connected in series, an inverter/charger circuit, a charge equalization circuit, a relay matrix, and a balance controller. The inverter/charger circuit operatively connected between the power source and the at least one battery string and between the at least one battery string and the load. The charge equalization circuit is capable of equalizing the charge on any pair of series connected batteries in the at least one battery string. The relay matrix operatively connected between is the charge equalization circuit and the at least one battery string. The balance controller controls the relay matrix such that at least one characteristic of at least one battery is sensed. Based on at least one sensed battery characteristic, the balance controller controls the relay matrix such that the charge equalization circuit is connected across at least one pair of series connected batteries in the at least one battery string.

The present invention may further be embodied as a battery system comprising a plurality of battery strings, at least one charge equalization circuit, a relay matrix, and a balance controller. Each battery string comprises more than two batteries connected in series, and the battery strings are connected in parallel. The at least one charge equalization circuit capable of equalizing the charge on any pair of series connected batteries. The relay matrix operatively connected between the charge equalization circuit and the plurality of battery strings. The balance controller for controlling the relay matrix such that battery characteristics of plurality of batteries are sensed. Based on the at least one sensed battery characteristic, the balance controller controls the relay matrix such that at least one charge equalization circuit is connected across at least one pair of series connected batteries in the plurality of battery strings.

The present invention may be embodied as a UPS system for supplying power to a load based on a power signal provided by a power source, comprising a plurality of battery strings, an inverter/charger circuit, at least one charge equalization circuit, and a relay matrix. Each battery string comprises more than two batteries connected in series, and the battery strings are connected in parallel. The inverter/charger circuit operatively connected between the power source and the at least one battery string and between the at least one battery string and the load. The at least one charge equalization circuit is capable of equalizing the charge on any pair of series connected batteries. The relay matrix operatively connected between the charge equalization circuit and the at least one battery string. The balance controller controls the relay matrix such that battery characteristics of the batteries are sensed. Based on the sensed battery characteristics, the balance controller controls the relay matrix such that at least one charge equalization circuit is connected across pairs of series connected batteries in the plurality of battery strings to equalize charges on the batteries.

The present invention may also be embodied as a UPS system for supplying power to a load based on a power signal provided by a power source, comprising a plurality of battery strings, an inverter/charger circuit, at least one charge equalization circuit, a relay matrix, and a balance controller. Each battery string comprises more than two batteries connected in series, and the battery strings are connected in parallel. The inverter/charger circuit is operatively connected between the power source and the at least one battery string and between the at least one battery string and the load. The at least one charge equalization circuit is capable of equalizing the charge on any pair of series connected batteries. The relay matrix is operatively connected between the charge equalization circuit and the at least one battery string. The balance controller controls the relay matrix such that battery characteristics of the batteries are sensed. Based on the sensed battery characteristics, the balance controller controls the relay matrix such that at least one charge equalization circuit is connected across pairs of series connected batteries in the plurality of battery strings to equalize charges on the batteries.

DETAILED DESCRIPTION

Figure 1:
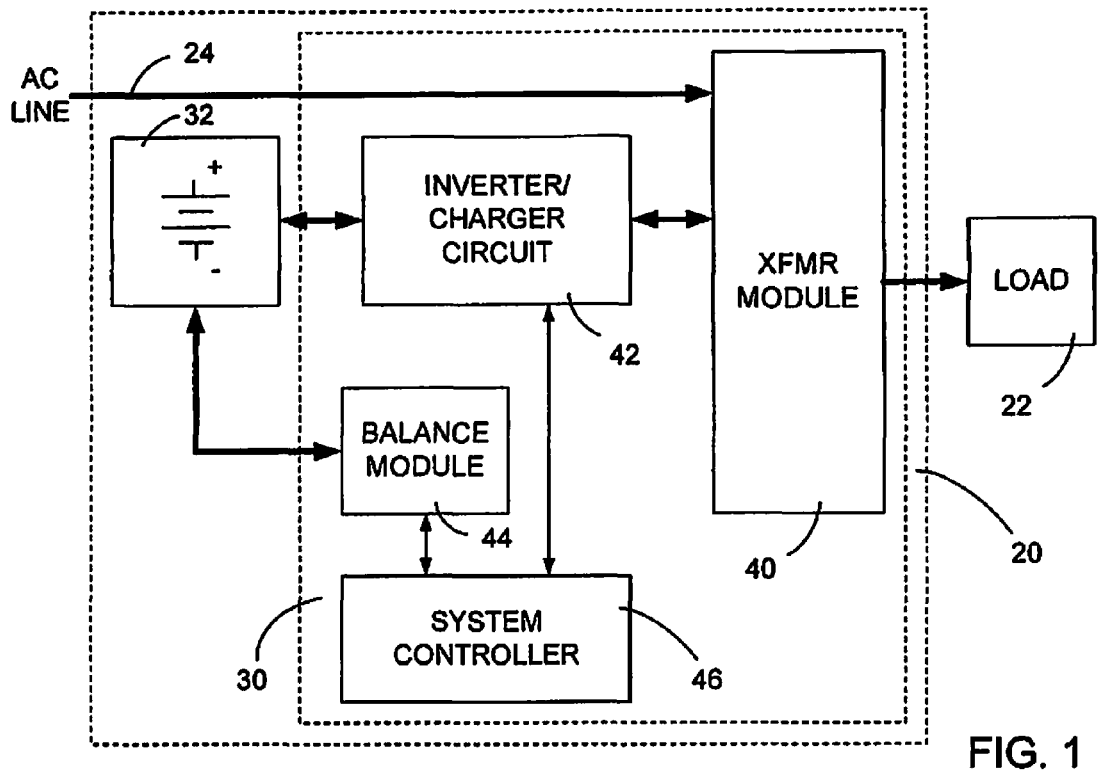
FIG. 1 is a simplified block diagram of a first embodiment of an uninterruptible power supply system using a battery balance module constructed in accordance with, and embodying, the principles of the present invention.

Referring initially to FIG. 1 of the drawing, depicted therein is a first example of an example power supply system 20 constructed in accordance with, and embodying, the principles of the present invention. The example power supply system 20 is an uninterruptible power supply (UPS) system, but the principles of the present invention may be used by other types of power supply systems.

In line mode, the example UPS system 20 generates a primary AC power signal for powering a load 22 based on a utility AC power signal present on an AC line 24. The example UPS system 20 comprises a power module 30 and a battery system 32. In standby mode, the power module 30 of the UPS system 20 generates a secondary AC power signal based on power stored by the battery system 32. The example UPS system 20 may further incorporate additional power sources, such as generators, fuel cells, solar cells, and the like.

The example UPS module 20 comprises a transformer module 40, an inverter/charger circuit 42, a balance module 44, and a system controller 46. The AC power line 24 is connected to the transformer module 40. The transformer module 40 is in turn connected to the load 22 and the inverter/charger circuit 42. The inverter charger circuit 42 is connected to the battery system 32. The balance module 44 is connected to the battery system 32. The system controller 46 is connected to the inverter charge circuit 42 and to the balance module 44.

In line mode, the transformer 40 generates a primary AC power signal based on the utility AC power signal flowing through the AC line 24. The transformer module 40 further generates a charge AC power signal that is input to the inverter/charger circuit 42. Based on the charge AC power signal, the example inverter/charger circuit 42 is capable of generating one or more of a plurality of charge DC power signals.

In standby mode, the battery system 32 generates a DC standby battery signal that flows to the inverter/charger circuit 42. The inverter/charger circuit 42 generates a switched power signal based on the DC standby battery signal, and the transformer module 40 generates the secondary AC power signal based on the switched power signal.

With the foregoing general understanding of the principles of the present invention in mind, the details of the first example UPS system 20 will now be described.

The example transformer module 40 comprises a ferroresonant transformer and related circuitry capable of isolating the load 22 from the AC line 24 and regulating the primary AC power signal in line mode. A is ferroresonant transformer also provides certain advantages when converting the switched power signal generated by the inverter/charger circuit 42 into the standby AC power signal. An example of an appropriate ferroresonant transformer and related circuitry that may be used as the transformer module 40 is disclosed, for example, in U.S. Pat. No. 5,760,495 and U.S. Patent Application Ser. No. 60/305,926 and Ser. No. 12/803,787. The '495 patent and the '926 and '787 applications are incorporated herein by reference. The principles of the present invention may, however, be applied to UPS systems that do not use a ferroresonant transformer. And as described above, the principles of the present invention may be applied to battery systems that are not part of a conventional UPS system.

The example inverter/charger circuit 42 may be implemented as any inverter capable of operating in an inverter mode to generate the switched power signal when the UPS system is in standby mode and, when the UPS system is in line mode, operating in a charge mode to generate one or more of the plurality of charge DC power signals. Alternatively, the principles of the present invention may be implemented using an inverter circuit capable of performing the inverter mode function and a separate charge circuit capable of performing the charge mode function.

In its charge mode, the example inverter/charger circuit 42 may be implemented in a form that generates the plurality of charge DC power signals simultaneously. Alternatively, the inverter/charger circuit 42 may be implemented to generate any one of the plurality of charge DC power signals when in its charge mode.

Figure 2:
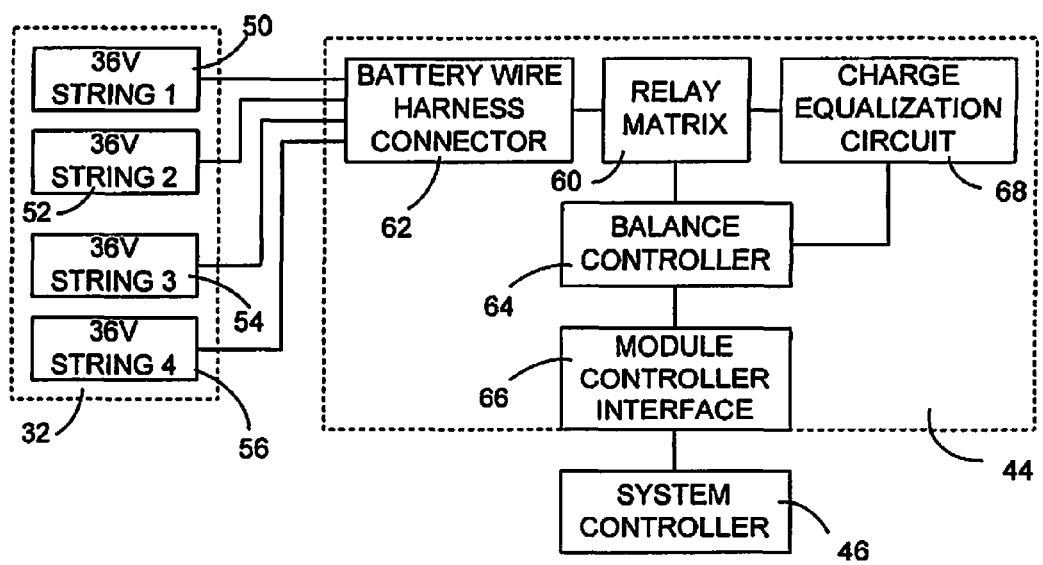
FIG. 2 is a schematic view of a first example battery balance module and example battery system forming part of the UPS system depicted in FIG. 1.

Referring now to FIG. 2 of the invention, the example battery system 32 and balance module 44 will now be described in further detail.

The example battery system 32 comprises a first battery string 50, a second battery string 52, a third battery string 54, and a fourth battery string 56. As will be explained in further detail below, each of these example battery strings 50, 52, 54, and 56 is a 36 volt battery string comprising three 12 volt batteries connected in series.

FIG. 2 further shows that the example balance module 44 comprises a relay matrix 60, a battery wire harness connector 62, a balance controller 64, a module controller interface 66, and a charge equalization circuit 68. The relay matrix 60 comprises a plurality of relays configured to allow the balance controller 64 to determine how the charge equalization circuit 68 is connected to one or more of the batteries in the battery strings 50, 52, 54, and 56. The battery wire harness connector 62 physically interconnects the relay matrix 60 to the batteries in the battery strings 50, 52, 54, and 56. The battery wire harness connector 62 also physically connects the balance controller 64 to any one or more of the batteries in the battery strings 50, 52, 54, and 56.

The balance controller 64 controls the relay matrix 60 and the charge equalization circuit 68 to measure voltage across any one or more of the batteries in the battery strings 50, 52, 54, and 56 and to apply any one or more of the charge DC power signals across any one or more of the batteries in the battery strings 50, 52, 54, and 56.

The example balance module 44 may thus be programmed to measure the voltage across individual batteries, groups of individual batteries within battery strings, and/or across entire battery strings and apply the charge DC power signals across any single battery or group of batteries to maintain proper charge of individual batteries within any one of the battery strings 50, 52, 54, and/or 56.

Figure 3:
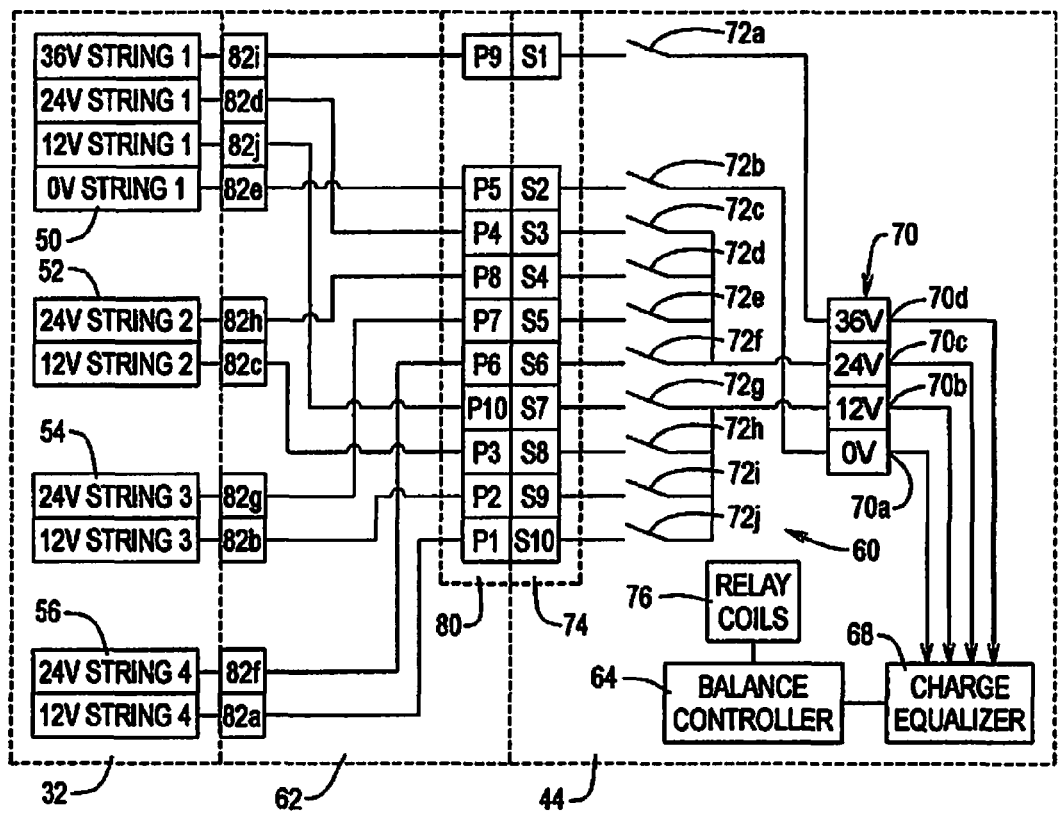
FIG. 3 is a somewhat schematic view of a first example battery wire harness connector and first example relay matrix used by the example battery balance module of FIG. 1.

Referring now to FIG. 3, the example relay matrix 60 and battery wire harness connector 62 are depicted in further detail. The example relay matrix 60 comprises an input connector 70, ten relays 72a-j, and an output connector 74. Each of the relays 72a-j has an associated relay coil; the ten relay coils associated with the relays 72a-j are schematically represented by a single block 76 in FIG. 3. The balance controller 64 is connected to the relay coils 76 such that the balance controller 64 can operate any of the relays 72a-j; in particular, the balance controller 64 can operate any individual relay or any group of relays as necessary to charge any single battery or group of batteries as desired. The example output connector 74 defines first through tenth output sockets S1-S10 as depicted in FIG. 3.

Figure 4:
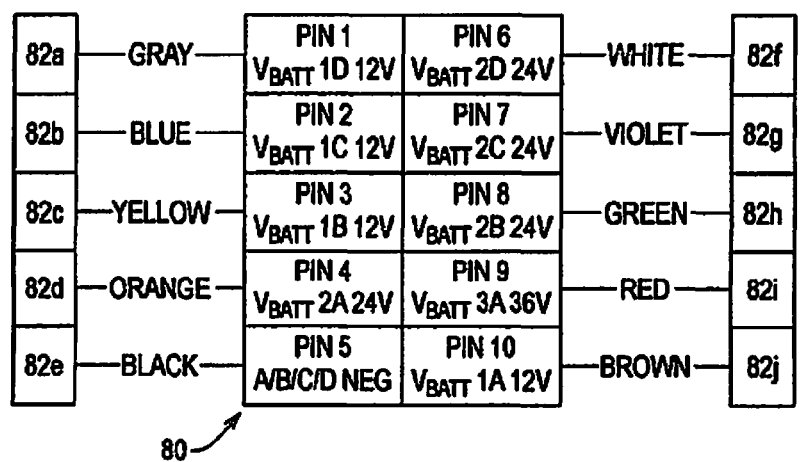
FIG. 4 is a somewhat schematic view of the first example battery wire harness connector used by the battery balance module of FIG. 1.
Figure 5:
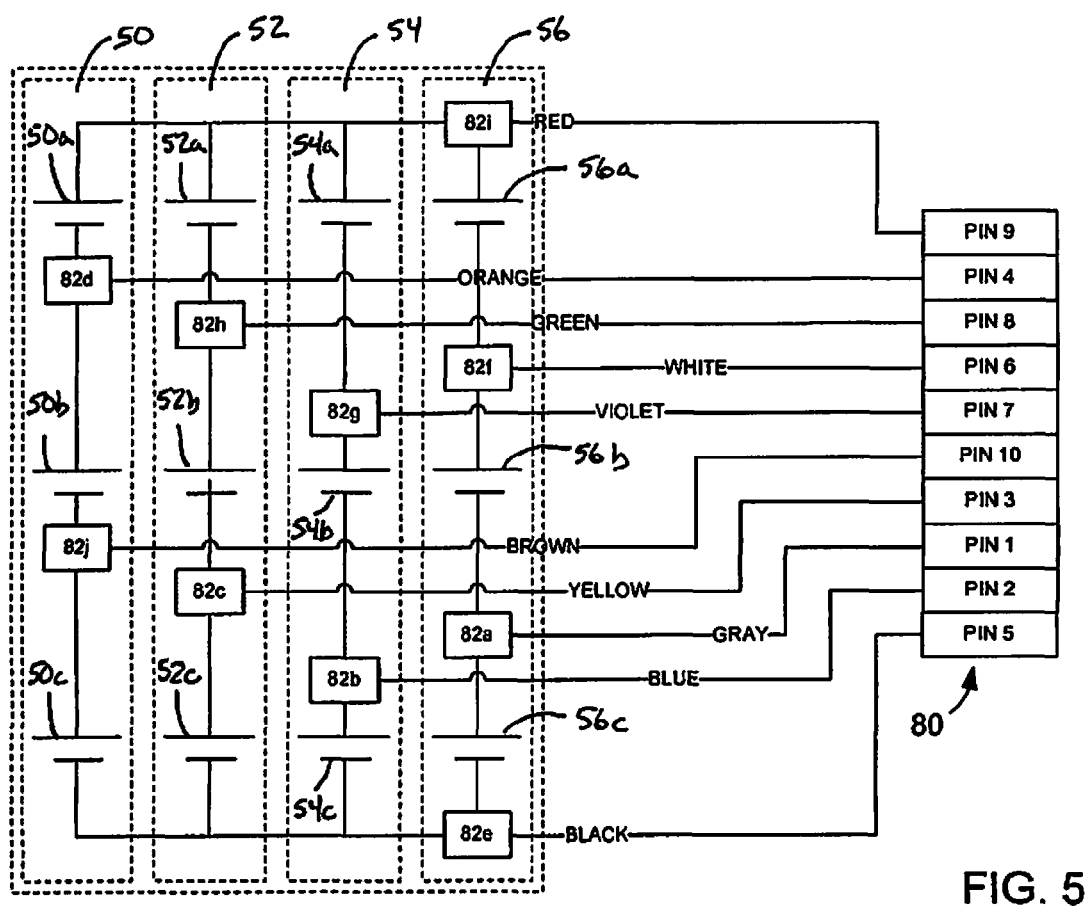
FIG. 5 is a somewhat schematic view of the connection between the first example battery wire harness connector and the battery module of FIG. 1.

The example battery wire harness connector 62 is depicted in FIGS. 3-5. In particular, the example wire harness connector 62 comprises a main connector 80 that is connected to the relay matrix 60 and a plurality of secondary connectors 82a-j that are connected at nodes within the battery strings 50, 52, 54, and 56 as shown in FIG. 5. The example main connector 80 defines first through tenth main pins P1-P10 as depicted in FIGS. 3-5. As is conventional, the output sockets S1-S10 are configured to engage the main pins P1-P10 to form an appropriate electrical connection.

FIG. 5 illustrates that each of the battery strings 50, 52, 54, and 56 comprises three series connected batteries: the first battery string 50 comprises batteries 50a, 50b, and 50c, the second battery string 52 comprises batteries 52a, 52b, and 52c, the third battery string 54 comprises batteries 54a, 54b, and 54c, and the fourth battery string 56 comprises batteries 56a, 56b, and 56c.

FIG. 5 further illustrates that the secondary connectors 82a-j are connected to each of the nodes within the battery system 32. Accordingly, in a measurement mode as depicted in FIG. 3, the balance controller 64 can measure the voltage across and/or current sourced from each of the batteries 50a-c, 52a-c, 54a-c, and 56a-c, and/or across or from combinations of these batteries connected in series, at the input connector 70 by arranging the relays 72a-j in appropriate configurations. In a charge mode, each of the individual batteries 50a-c, 52a-c, 54a-c, and 56a-c, and/or across combinations of these batteries connected in series, can be charged by arranging the relays 72a-j in appropriate configurations and operating the charge equalization circuit 68 to apply appropriate DC power signals at the input connector 70.

In particular, in the example balance module 44, the example input connector 70 comprises first, second, third, and fourth input terminals 70a, 70b, 70c, and 70d connected to first (0V), second (12V), third (24V), and fourth (36V) voltages, respectively. The first input terminal 70a is connected to the second relay 72b, the second input terminal 70b is connected to the seventh, eighth, ninth, and tenth relays 72g, 72h, 72i, and 72j, the third input terminal 70c is connected to the third, fourth, fifth, and sixth relays 72c, 72d, 72e, and 72f, and the fourth input is connected to the first relay 72a.

In turn, the first switch 72a is connected to the ninth main pin P9, the second switch 72b is connected to the fifth main pin P5, the third switch 72c is connected to the fourth main pin P4, the fourth switch 72d is connected to the eighth main pin P8, the fifth switch 72e is connected to the seventh main pin P7, the sixth switch 72f is connected to the sixth main pin P6, seventh switch 72g is connected to the tenth main pin P10, the eighth switch 72h is connected to the third main pin P3, the ninth switch 72i is connected to the second main pin P2, and the tenth switch 72j is connected to the first main pin P1.

In turn, the first main pin P1 is connected to the first secondary connector 82a, the second main pin P2 is connected to the second secondary connector 82b, the third main pin P3 is connected to the third secondary connector 82c, the fourth main pin P4 is connected to the fourth secondary connector 82d, the fifth main pin P5 is connected to the fifth secondary connector 82e, the sixth main pin P6 is connected to the sixth secondary connector 82f, the seventh main pin P7 is connected to the seventh secondary connector 82g, the eighth main pin P8 is connected to is the eighth secondary connector 82h, the ninth main pin P9 is connected to the ninth secondary connector 82i, and the tenth main pin P10 is connected to the tenth secondary connector 82j.

The balance controller 64 of the balance module 44 may be provided with logic to determine when and how to charge individual batteries and/or combination of these batteries. The exact charge logic implemented using the balance module 44 is not part of the present invention and may be implemented according to the requirements of a particular operator of the UPS system 20. The balance module 44 provides enhanced diagnostic information and charge control, thereby optimizing the operation of the overall UPS system 20.

Figure 6:
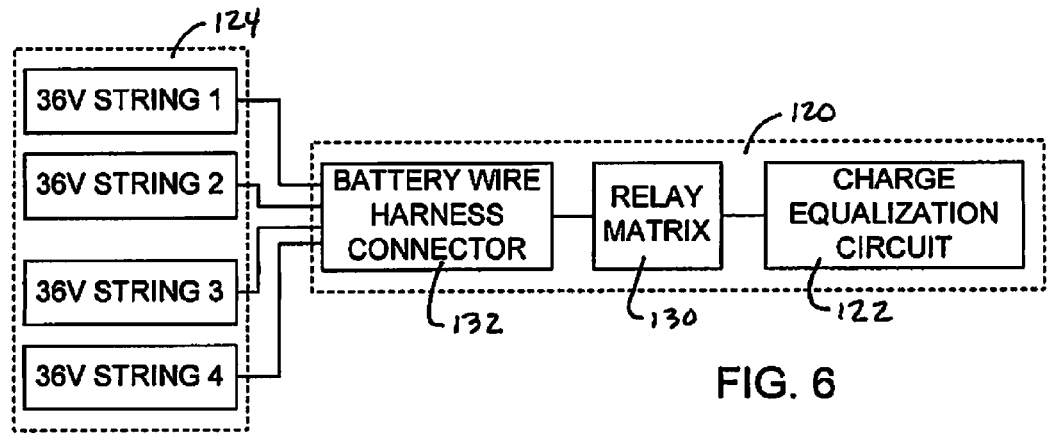
FIG. 6 is a schematic view of a second example battery balance module of the present invention.

Referring now to FIG. 6 of the drawing, depicted at 120 therein is a second example balance module constructed in accordance with, and embodying, the principles of the present invention. The example balance module 120 operatively connects a charge equalization circuit 122 to a battery system 124. The balance module 120 comprises a relay matrix 130 and a battery wire harness connector 132 in addition to the charge equalization circuit 122.

Figure 7:
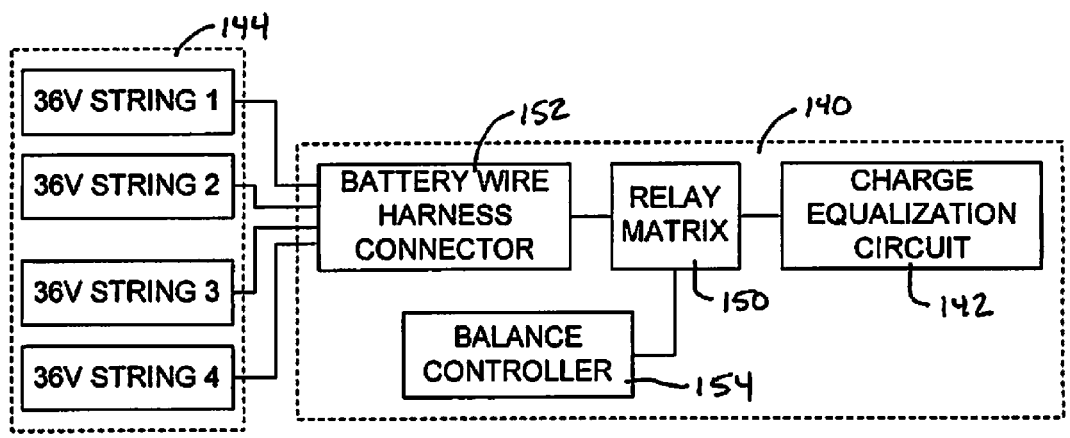
FIG. 7 is a schematic view of a third example battery balance module of the present invention.

Depicted in FIG. 7 is a third example balance module 140 constructed in accordance with, and embodying, the principles of the present invention. The example balance module 140 operatively connects a charge equalization circuit 142 to a battery system 144. The balance module 140 comprises, in addition to the charge equalization circuit 142, a relay matrix 150, a battery wire harness connector 152, and a balance controller 154. In the third example balance module 140, the functions of measuring voltage and/or current and balancing charge on the batteries in the battery system 144 are implemented in software within the balance controller 154.

Figure 8:
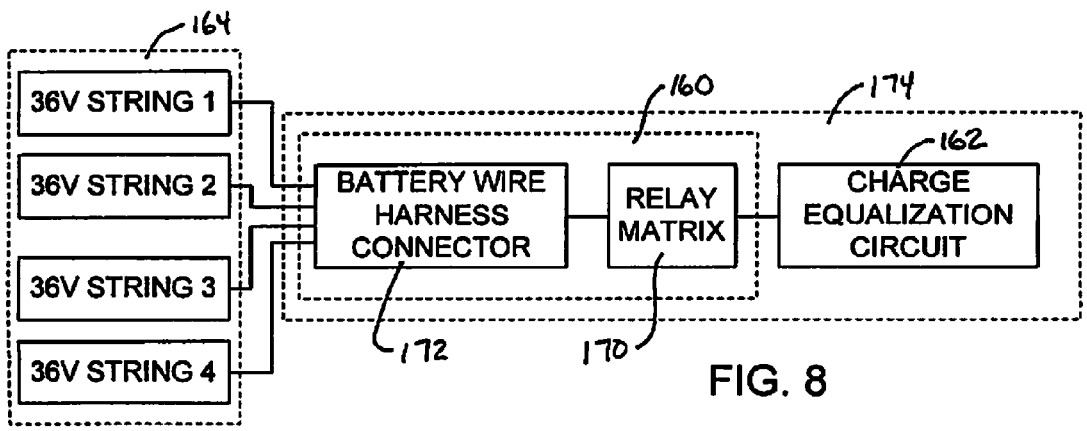
FIG. 8 is a schematic view of a fourth example battery balance module of the present invention.

Depicted in FIG. 8 is a fourth example balance module 160 constructed in accordance with, and embodying, the principles of the is present invention. The example balance module 160 operatively connects a charge equalization circuit 162 to a battery system 164. The balance module 160 comprises a relay matrix 170 and a battery wire harness connector 172. In the fourth example balance module 160, the charge equalization circuit 162 and the balance module 160 are combined to form a power module 174. In the fourth example balance module 160, the functions of measuring voltage and/or current and balancing the charge on the batteries in the battery system 164 are implemented in hardware within the balance module 160.

Figure 9:
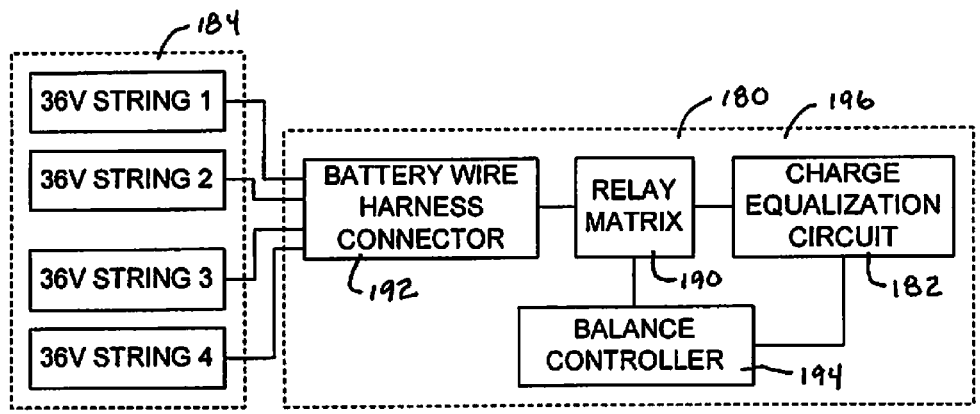
FIG. 9 is a schematic view of a fifth example battery balance module of the present invention.

Depicted in FIG. 9 is a fifth example balance module 180 constructed in accordance with, and embodying, the principles of the present invention. The example balance module 180 operatively connects a charge equalization circuit 182 to a battery system 184. The balance module 180 further comprises a relay matrix 190, a battery wire harness connector 192, and a balance controller 194. In the fifth example balance module 180, the charge equalization circuit 182 and the balance module 180 are combined to form a power module 196. The functions of measuring voltage and/or balancing the charge on the batteries in the battery system 184 are implemented in software executed by the balance controller 194.

Figure 10:
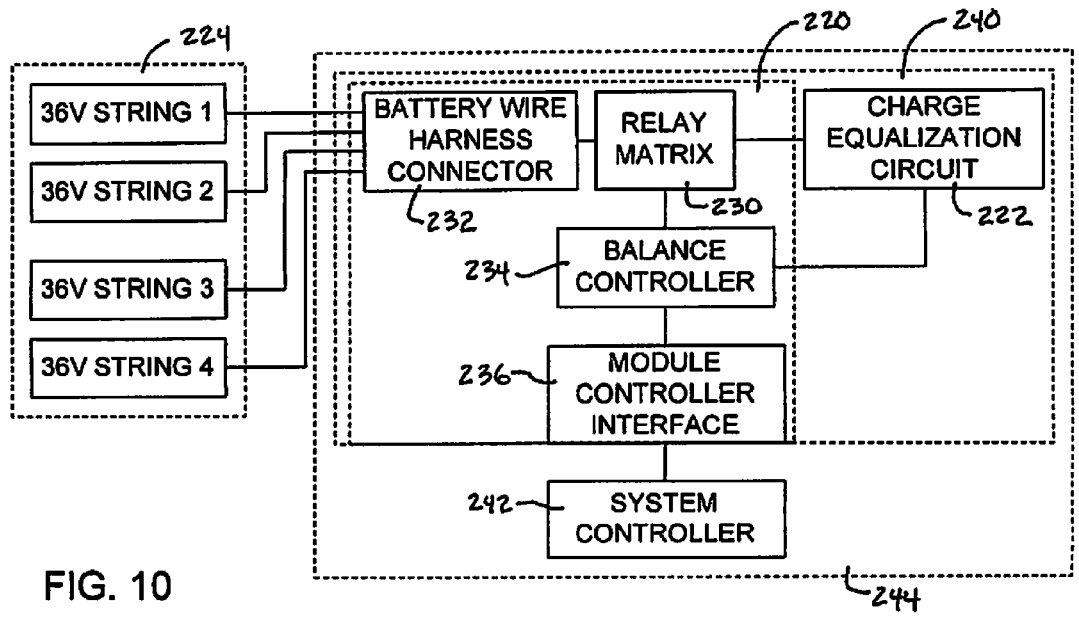
FIG. 10 is a schematic view of a sixth example battery balance module of the present invention.

Depicted in FIG. 10 is a sixth example balance module 220 constructed in accordance with, and embodying, the principles of the present invention. The example balance module 220 operatively connects a charge equalization circuit 222 to a battery system 224. The balance module 220 further comprises a relay matrix 230, a battery wire harness connector 232, a balance controller 234, and a module controller interface 236. In the sixth example balance module 220, the charge equalization circuit 222 and the balance module 220 are combined to form a power module 240. In addition, the power module 240 is in communication through the module controller interface 236 with a system controller 242 of is a larger UPS system 244. The functions of measuring voltage and/or current and balancing the charge on the batteries in the battery system 224 are implemented in software executed by the balance controller 234.

Figure 11:
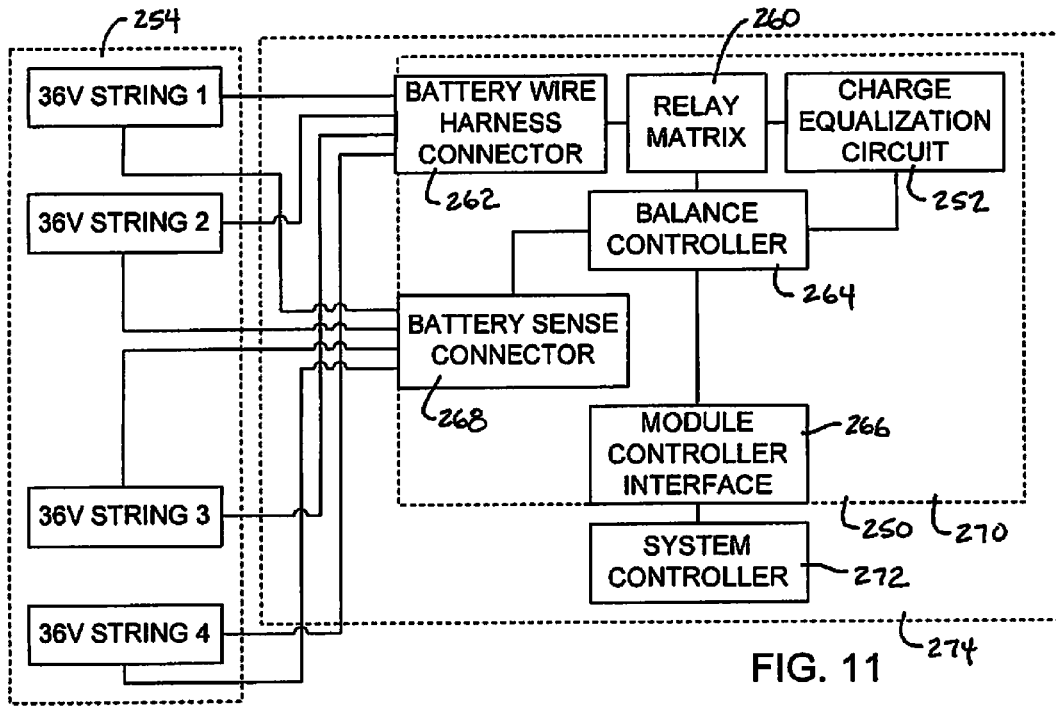
FIG. 11 is a schematic view of a seventh example battery balance module of the present invention.

Depicted in FIG. 11 is a seventh example balance module 250 constructed in accordance with, and embodying, the principles of the present invention. The example balance module 250 operatively connects a charge equalization circuit 252 to a battery system 254. The balance module 250 further comprises a relay matrix 260, a battery wire harness connector 262, a balance controller 264, a module controller interface 266, and a battery sense connector 268. The charge equalization circuit 252 and the balance module 250 are combined to form a power module 270. In addition, the power module 270 is in communication with a system controller 272 of a larger UPS system 274. The functions of measuring voltage and/or current and balancing charge on the batteries in the battery system 254 are implemented in software executed by the balance controller 264. The battery sense connector 268 allows the balance controller 264 to measure other factors, such as ambient temperature, relevant to battery diagnostics and take these other factors into account when charging the batteries in the battery system 254.

Figure 12:
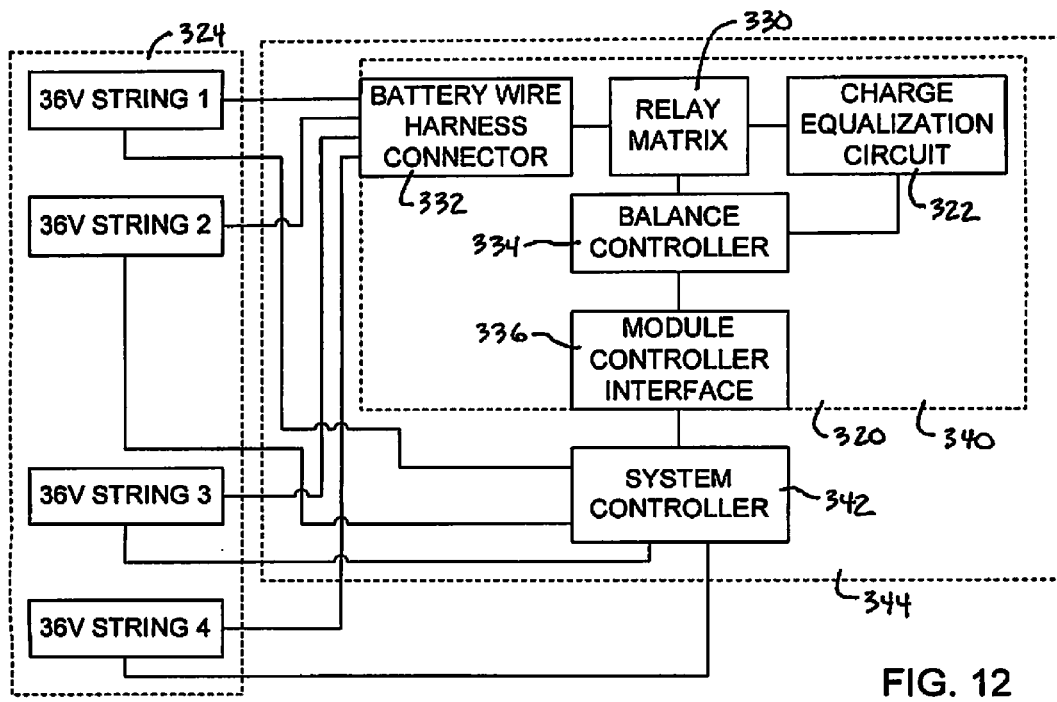
FIG. 12 is a schematic view of an eighth example battery balance module of the present invention.

Depicted in FIG. 12 is an eighth example balance module 320 constructed in accordance with, and embodying, the principles of the present invention. The example balance module 320 operatively connects a charge equalization circuit 322 to a battery system 324. The balance module 320 further comprises a relay matrix 330, a battery wire harness connector 332, a balance controller 334, and a module controller interface 336. The charge equalization circuit 322 and the balance module 320 are combined to form a power module 340. In addition, the power module 340 is in communication with a system controller 342 of a larger UPS system 344. The functions of measuring voltage and/or current and balancing charges across the batteries in the battery system 324 are implemented in software executed by the balance controller 334 through the charge equalization circuit 322. The system controller 342 is further in direct communication with the battery system 324; the system controller 342 thus may measure other factors, such as ambient temperature, relevant to battery diagnostics and communicate these factors to the balance controller 334.

Figure 13:
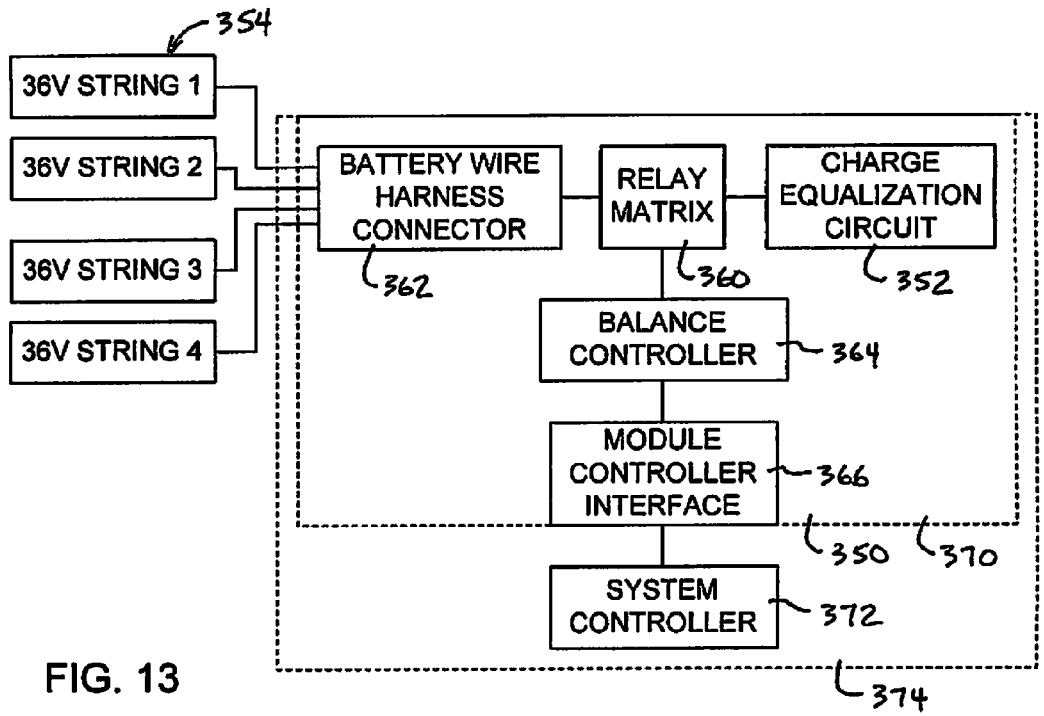
FIG. 13 is a schematic view of a ninth example battery balance module of the present invention.

Depicted in FIG. 13 is a ninth example balance module 350 constructed in accordance with, and embodying, the principles of the present invention. The example balance module 350 operatively connects a charge equalization circuit 352 to a battery system 354. The balance module 350 further comprises a relay matrix 360, a battery wire harness connector 362, a balance controller 364, and a module controller interface 366. The charge equalization circuit 352 and the balance module 350 are combined to form a charge module 370, but the balance module 350 does not control the charge equalization circuit 352. In addition, the charge module 370 is in communication with a system controller 372 of a larger UPS system 374. The functions of measuring voltage and/or current and balancing the charge across the batteries in the battery system 354 are implemented in software executed by the balance controller 364.

Figure 14:
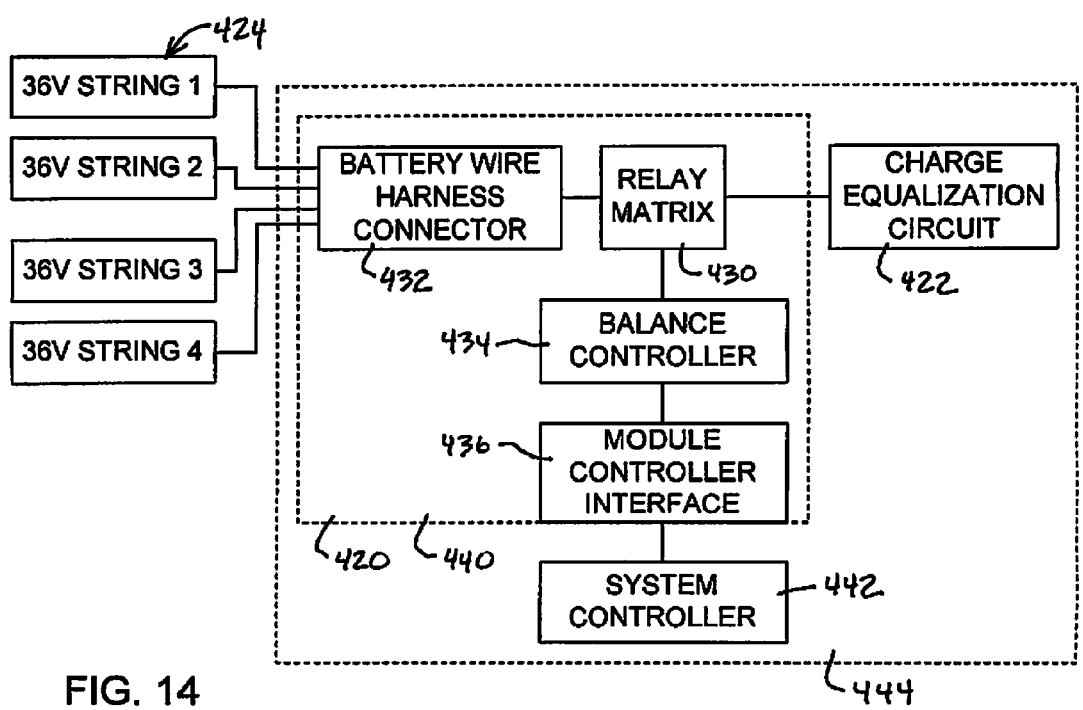
FIG. 14 is a schematic view of a tenth example battery balance module of the present invention.

Depicted in FIG. 14 is a tenth example balance module 420 constructed in accordance with, and embodying, the principles of the present invention. The example balance module 420 operatively connects a charge equalization circuit 422 to a battery system 424. The balance module 420 further comprises a relay matrix 430, a battery wire harness connector 432, a balance controller 434, and a module controller interface 436. The power module 440 is in communication with a system controller 442 of a larger UPS system 444. The functions of measuring voltage and/or current and balancing voltages across the batteries in the battery system 424 are implemented in software executed by the balance controller 434.

Figure 15:
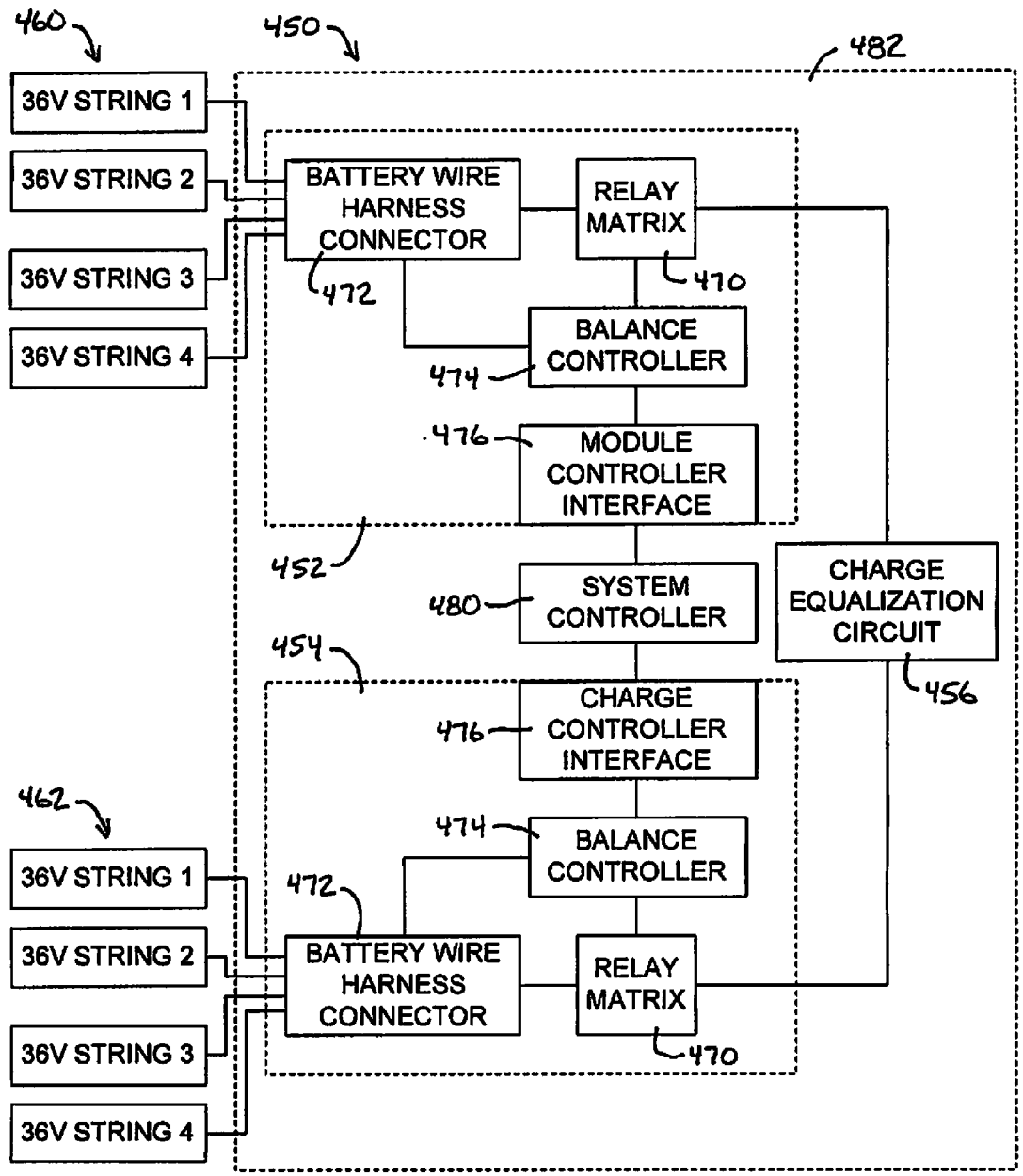
FIG. 15 is a schematic view of an eleventh example battery balance module of the present invention.

Depicted in FIG. 15 is an eleventh example charge system 450 constructed in accordance with, and embodying, the principles of the present invention. The example charge system 450 comprises first and second balance modules 452 and 454. The first and second balance modules 452 and 454 operatively connect a charge equalization circuit 456 to first and second battery systems 460 and 462, respectively. The example balance modules 452 and 454 are identical, and each of the modules 452 and 454 comprises a relay matrix 470, a battery wire harness connector 472, a balance controller 474, and a module controller interface 476. The functions of measuring voltage and/or current and balancing the charges on the batteries in the first and second battery systems 460 and 462 are implemented in software executed by the balance controllers 474 of the first and second balance modules 452 and 454, respectively. In the eleventh example charge system 450, a single charge equalization circuit 456 is provided for both of the first and second balance modules 452 and 454. In addition, the balance modules 452 and 454 are in communication with a system controller 480 of a larger UPS system 482 including the charge equalization circuit 456.

Figure 16:
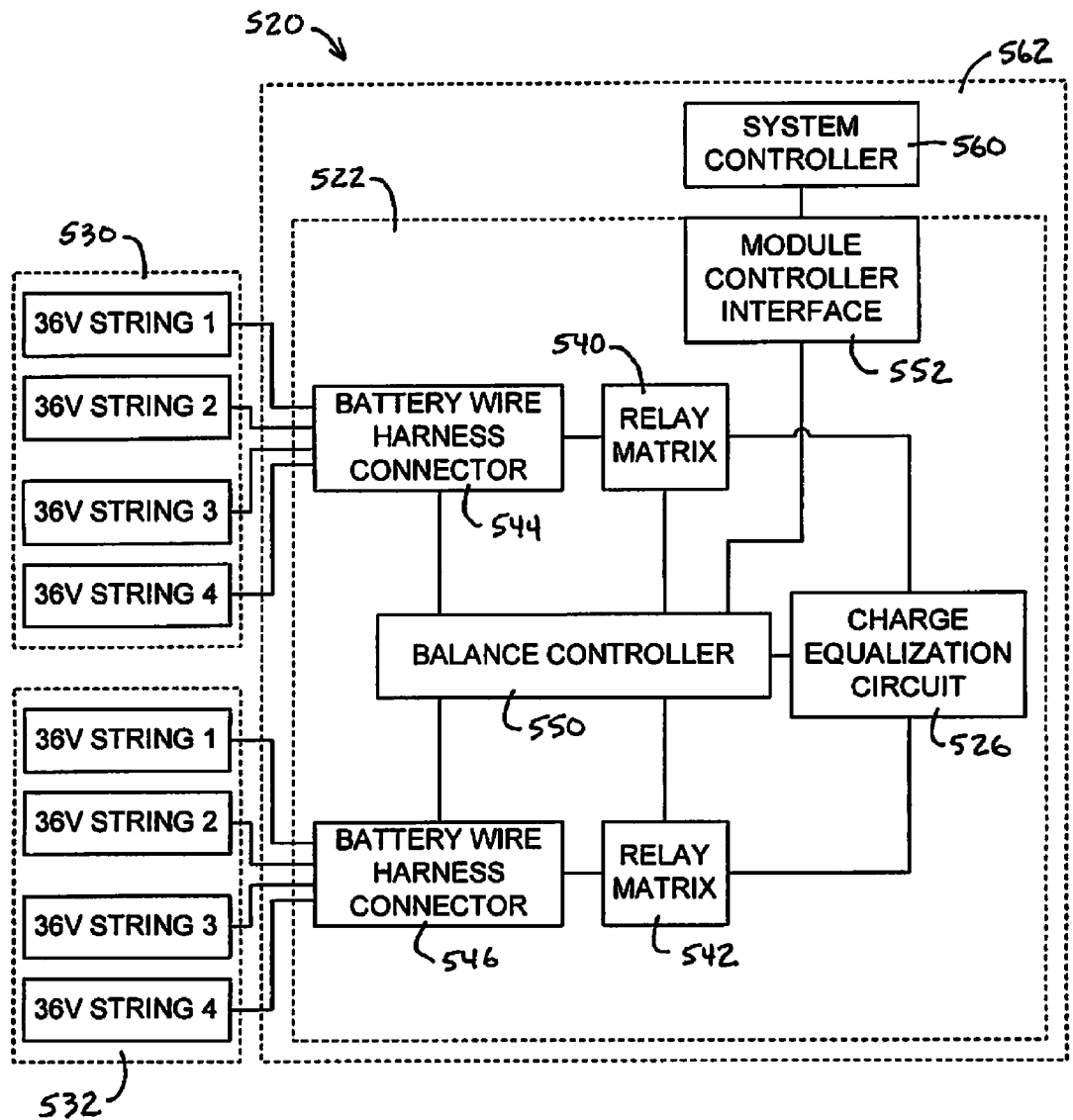
FIG. 16 is a schematic view of a twelfth example battery balance module of the present invention.

Depicted in FIG. 16 is a twelfth example charge system 520 constructed in accordance with, and embodying, the principles of the present invention. The example charge system 520 comprises a balance module 522 that comprises a charge equalization circuit 526 operatively connected to first and second battery systems 530 and 532, respectively. In particular, the example balance module 522 comprises first and second relay matrixes 540 and 542, first and second battery wire harness connectors 544 and 546, a balance controller 550, and a module controller interface 552. The functions of measuring voltage and/or current and balancing the charge across the batteries in the first and second battery systems 530 and 532 are implemented in software executed by the balance controller 550. In the twelfth example charge system 520, a single balance controller 550 is provided for both of the first and second relay matrixes 540 and 542 and the first and second battery wire harness connectors 544 and 546. Similarly, a single charge equalization circuit 526 is provided for both of the first and second relay matrixes 540 and 542 and the first and second battery wire harness connectors 544 and 546. The charge system 520 is in communication with a system controller 560 of a larger UPS system 562 through the module controller interface 552.

Figure 17:
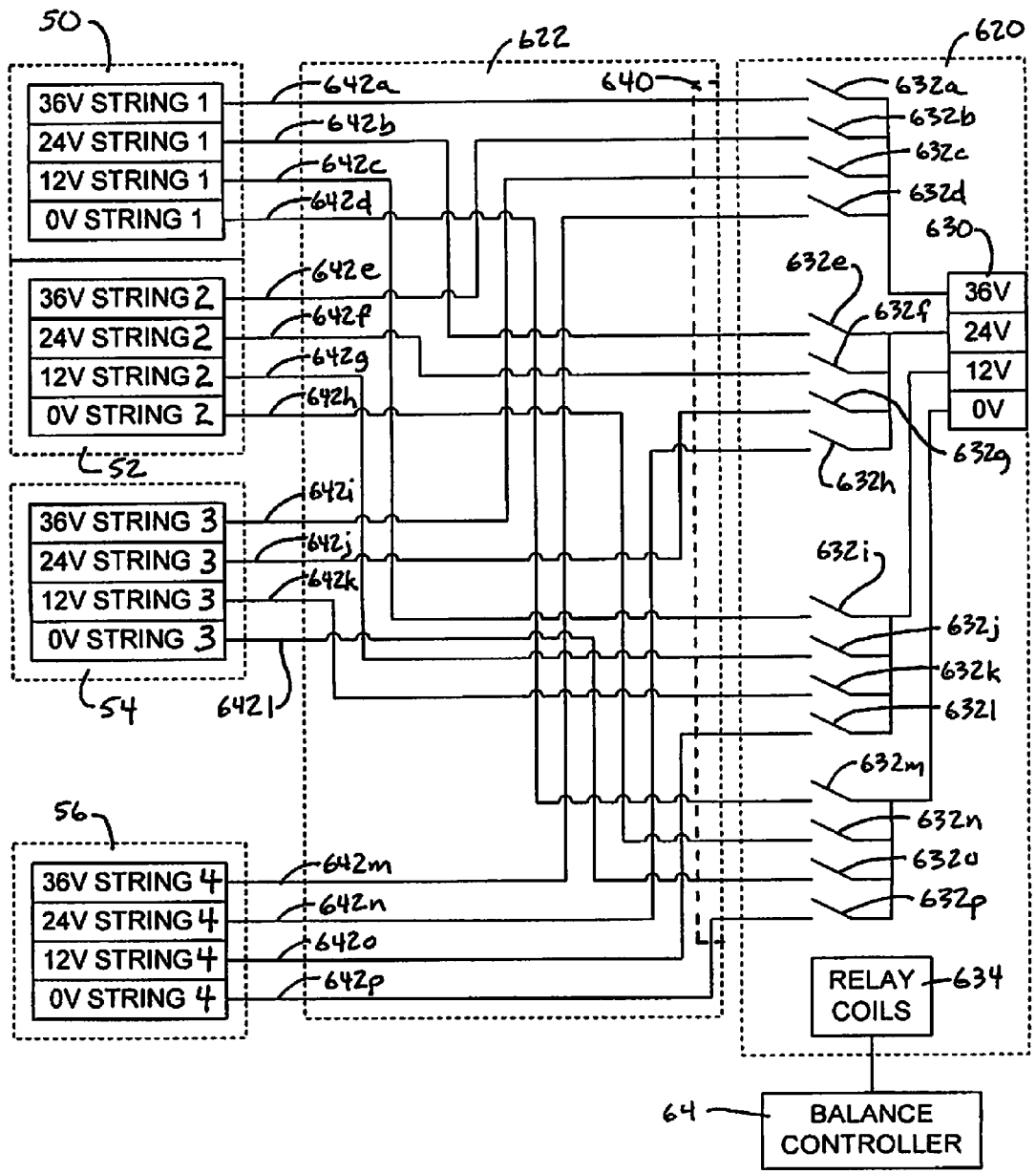
FIG. 17 is a somewhat schematic view of a second example battery wire harness connector and second example relay matrix of another example battery balance module of the present invention.

Depicted in FIG. 17 is a second example relay matrix 620 and second example battery wire harness connector 622 that may be substituted for the first example relay matrix 60 and first example battery wire harness connector 62 in the first example power module 30 described above.

The example relay matrix 620 comprises an input connector 630 and sixteen relays 632a-p. Each of the relays 632a-p has an associated relay coil; the sixteen relay coils associated with the sixteen relays 632a-p are schematically represented by a single block 634 in FIG. 17. The balance controller 64 is connected to the relay coils 634 such that the balance controller 64 can operate any of the relays 632a-p; in particular, the balance controller 64 can operate any individual relay or any group of relays as necessary to charge any single battery or group of batteries as desired.

The example wire harness connector 622 comprises a main connector 640 that is connected to the relay matrix 620 and sixteen secondary connectors 642a-p that are connected at nodes within the battery strings 50, 52, 54, and 56.

In a measurement mode, the balance controller 64 can measure the voltage across and/or current sourced from each of the batteries 50a-c, 52a-c, 54a-c, and 56a-c (FIG. 5), and/or across or from combinations of these batteries connected in series, at the input connector 630 by arranging the relays 632a-p in appropriate configurations. Further, the use of sixteen relays 632a-p and sixteen secondary connectors 642a-p allow the voltage across individual strings of batteries to be measured.

In a charge mode, each of the individual batteries 50a-c, 52a-c, 54a-c, and 56a-c, and/or across combinations of these batteries connected in series, can be charged by arranging the relays 632a-p in appropriate configurations and operating the charge equalization circuit 68 (FIG. 3) to apply appropriate DC power signals at the input connector 630. Further, each of the individual strings of batteries may be charged separately using the relay matrix 620 and battery wire harness connector 622.

The use of additional relays of the second example relay matrix 620 and connectors of the battery wire harness connector 622 allows finer control over the measurement and charging functions performed by the first example power module 30.

Figure 18:
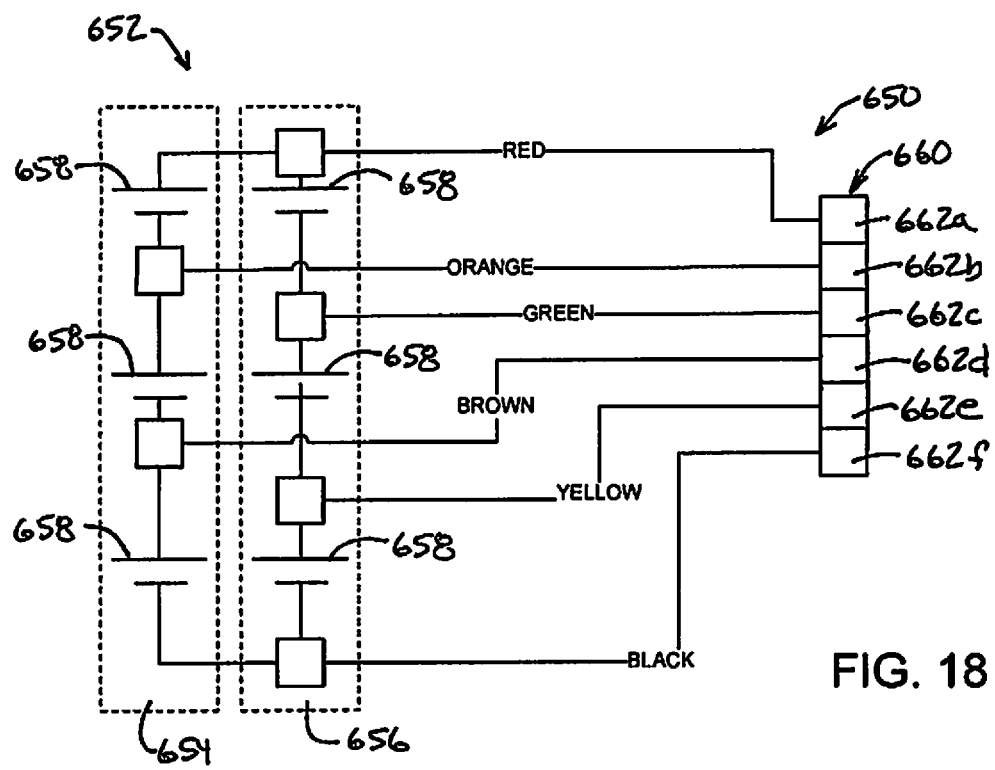
FIG. 18 is a somewhat schematic view of the connection between a third example battery wire harness connector and a second example battery module.

Turning now to FIG. 18, depicted therein is a third example battery wire harness connector 650 that may be used by a power module of the present invention adapted to charge a battery system 652 comprising first and second strings 654 and 656 each comprising three series-connected batteries 658. The third example wire harness connector 650 comprises a main connector 660 adapted to be connected to a relay matrix and six secondary connectors 662a-f that are connected at nodes within the battery strings 654 and 656.

The third example wire harness connector 650 illustrates that the principles of the present invention can be scaled to accommodate differing numbers of battery strings. The principles of the present invention may also be scaled up or down to accommodate battery strings having fewer or more than three batteries.

Figure 19:
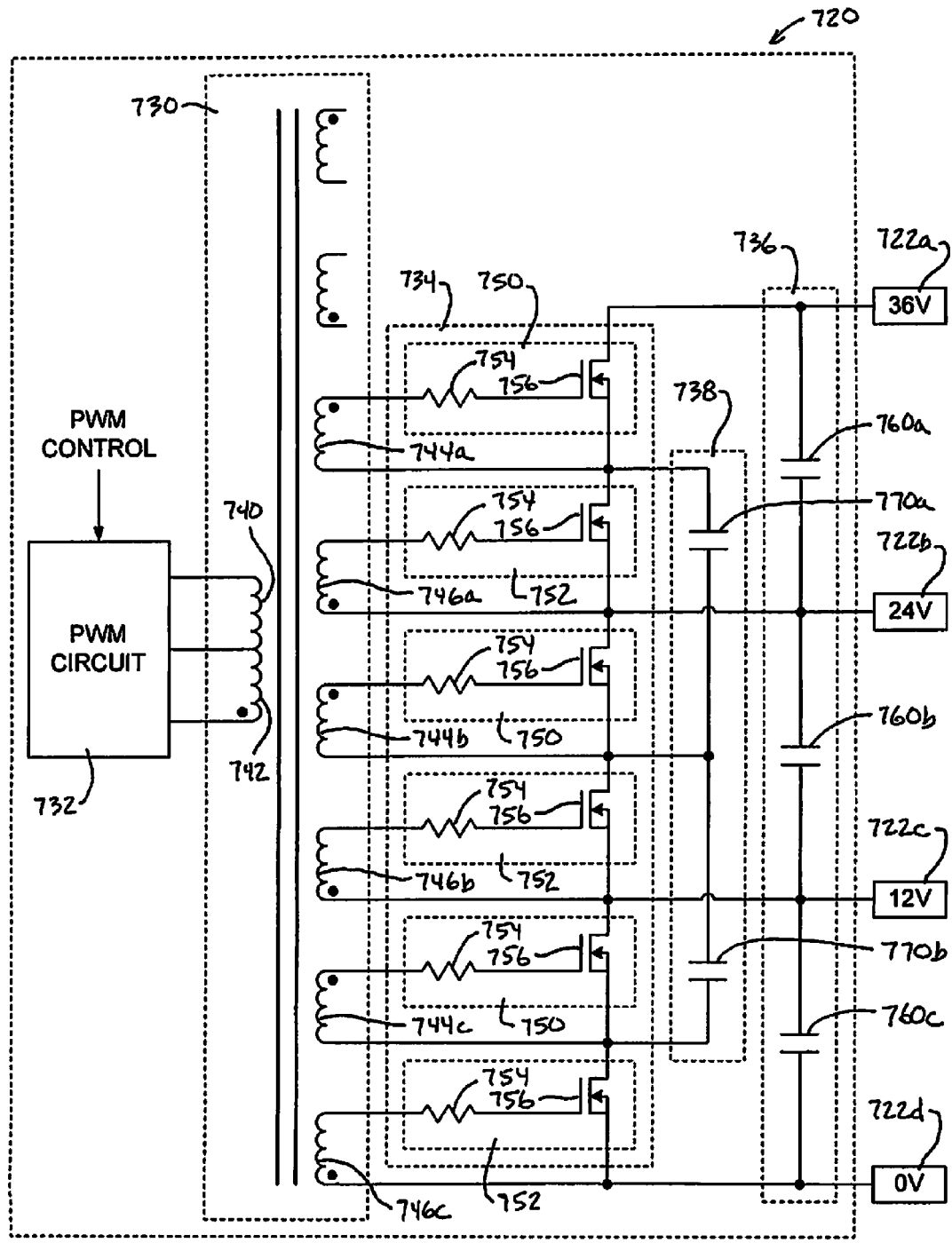
FIG. 19 is a somewhat schematic view of an example charge equalization circuit that may be used by the power supply systems of the present invention.

Referring now to FIG. 19 of the drawing, depicted therein is an example battery equalization circuit 720 that may be used by any of the charge systems described above. The example battery equalization circuit 720 defines first, second, third, and fourth connection points 722a, 722b, 722c, and 722d for connection to the relay matrix of the charge system. The example battery equalization circuit 720 comprises a transformer 730, a PWM circuit 732, a switch portion 734, a filter portion 736, and a transfer portion 738.

The example transformer 730 comprises first and second input windings 740 and 742, a plurality of first output windings 744a, 744b, and 744c, and a plurality of second output windings 746a, 746b, and 746c. The first and second input windings 740 and 742 are operatively connected to the PWM circuit 732, and the output windings 744 and 746 are operatively connected to the switch portion 734. The switch portion 734 comprises a plurality of first and second switch circuits 750 and 752 each comprising a resistor 754 and a transistor 756 (MOSFET). The example filter portion 736 comprises first, second, and third filter capacitors 760a, 760b, and 760c, and the example transfer portion 738 comprises first and second flying capacitors 770a and 770b.

The PWM control signal allows the PWM circuit 732 to be operated in a free-running state and an off state. In the free-running state, the example PWM circuit 732 generates a PWM control signal having a frequency of 800 kHz and a 50% duty cycle. In this free-running state, the PWM control signal is transmitted to the switch portion 734 through the transformer 730 such that the first switch circuits 750 are open while the second switch circuits 752 are closed and such that the first switch circuits 750 are closed while the second switch circuits 752 are open. In the first half of the period, the PWM control signal is transmitted to the switch portion 734 through the transformer 730 such that the first switch circuits 750 is closed and the second switch circuits 752 is open. In the second half of the period, the PWM control signal is transmitted to the switch portion 734 through the transformer 730 such that the first switch circuits 750 is open and the second switch circuits 752 is closed.

In use, the example battery equalization circuit 720 operates to connect two adjacent or connected batteries in any string of batteries as defined by a relay matrix to equalize the voltages on the adjacent batteries. Alternative battery equalization circuits that may be configured to operate in the same manner as the example battery equalization circuit 720 are described in the following U.S. Patents, which are incorporated herein by reference: U.S. Pat. Nos. 5,710,504 and 6,841,971.

Given the foregoing, it should be apparent that the principles of the present invention may be embodied in forms other than those described above. The scope of the present invention should thus be determined by the claims to be appended hereto and not the foregoing detailed description of the invention.

What is claimed is:

1. A battery system comprising:
   a plurality of battery strings comprising more than two batteries connected in series, where the plurality of battery strings are connected in parallel;
   a charge equalization circuit capable of equalizing the charge on any pair of series connected batteries in the any one of the plurality of battery strings;
   a relay matrix operatively connected between the charge equalization circuit and the plurality of battery strings; and
   a balance controller for controlling the relay matrix; wherein
   based on at least one of a sensed voltage and a sensed current of the batteries, the balance controller controls the relay matrix such that the charge equalization circuit is connected across any one of the pairs of series connected batteries in any one of the plurality of battery strings.

2. The battery system as recited in claim 1, in which the balance controller controls the relay matrix such that the charge equalization circuit is connected across a plurality of pairs of series connected batteries in the plurality of battery strings.

3. The battery system as recited in claim 1, further comprising a wire harness connected between the relay matrix and the plurality of battery strings.

4. A UPS system for supplying power to a load based on a power signal provided by a power source, comprising:
   a plurality of battery strings comprising more than two batteries connected in series, where the plurality of battery strings are connected in parallel;
   an inverter and charger circuit operatively connected between
      the power source and the at least one battery string, and
      the at least one battery string and the load;
   a charge equalization circuit capable of equalizing the charge on any pair of series connected batteries in the any one of the plurality of battery strings;
   a relay matrix operatively connected between the charge equalization circuit and the plurality of battery strings; and
   a balance controller for controlling the relay matrix; wherein
   based on at least one of a sensed voltage and a sensed current of the batteries, the balance controller controls the relay matrix such that the charge equalization circuit is connected across any one of the pairs of series connected batteries in any one of the plurality of battery strings.

5. The UPS system as recited in claim 4, in which balance controller controls the relay matrix such that the charge equalization circuit is connected across a plurality of pairs of series connected batteries in any one of the plurality of battery strings.

6. The UPS system as recited in claim 4, further comprising a wire harness connected between the relay matrix and the plurality of battery strings.

7. The UPS system as recited in claim 4, further comprising a transformer module operatively connected between:
   the power source and the load; and
   the inverter and charger circuit and the load.

8. A battery system comprising:
   a plurality of battery strings, where
      each battery string comprises more than two batteries connected in series, and
      the battery strings are connected in parallel;
   at least one charge equalization circuit capable of equalizing the charge on any pair of series connected batteries;
   a relay matrix operatively connected between the charge equalization circuit and the plurality of battery strings; and
   a balance controller for controlling the relay matrix; wherein
   based on at least one of a sensed voltage and a sensed current of the batteries, the balance controller controls the relay matrix such that at least one charge equalization circuit is connected across any one of the pairs of series connected batteries in any one of the plurality of battery strings.

9. The battery system as recited in claim 8, in which the balance controller controls the relay matrix such that the charge equalization circuit is connected across a plurality of pairs of series connected batteries in the plurality of battery strings.

10. The system as recited in claim 8, further comprising a wire harness connected between the relay matrix and the at least one battery string.

11. A UPS system for supplying power to a load based on a power signal provided by a power source, comprising:
    a plurality of battery strings, where
       each battery string comprises more than two batteries connected in series, and
       the battery strings are connected in parallel;
    an inverter and charger circuit operatively connected between
       the power source and the at least one battery string, and
       the at least one battery string and the load;
    at least one charge equalization circuit capable of equalizing the charge on any pair of series connected batteries in any one of the plurality of battery strings;
    a relay matrix operatively connected between the charge equalization circuit and the plurality of battery strings;
    a balance controller for controlling the relay matrix; wherein
    based on at least one of a sensed voltage and a sensed current of the batteries, the balance controller controls the relay matrix such that at least one charge equalization circuit is connected across a plurality of pairs of series connected batteries in the plurality of battery strings to equalize charges on the batteries.

12. The UPS system as recited in claim 11, further comprising a wire harness connected between the relay matrix and the plurality of battery strings.

13. The UPS system as recited in claim 11, further comprising a transformer module operatively connected between:
    the power source and the load; and
    the inverter and charger circuit and the load.

14. A method of supplying power to a load based on a power signal provided by a power source, comprising:
  providing a plurality of battery strings each comprising more than two batteries connected in series;
  connecting the battery strings in parallel;
  operatively connecting an inverter and charger circuit between
    the power source and the at least one battery string, and
    the at least one battery string and the load;
  providing at least one charge equalization circuit capable of equalizing the charge on any pair of series connected batteries in the any one of the plurality of battery strings;
  operatively connecting a relay matrix between the charge equalization circuit and the plurality of battery strings;
  providing a balance controller for controlling the relay matrix; and
  operating the balance controller to control the relay matrix such that the relay matrix is controlled such that at least one charge equalization circuit is connected across a plurality of pairs of series connected batteries in the plurality of battery strings to equalize charges on the batteries based on sensed voltage and current of the batteries in the plurality of battery strings.

15. The method as recited in claim 14, further comprising the step of connecting a wire harness connected between the relay matrix and the plurality of battery strings.

16. The method as recited in claim 14, further comprising the step of operatively connecting a transformer module between:
  the power source and the load; and
  the inverter and charger circuit and the load.

* * * * *